United States Patent [19]

Phillips et al.

[11] Patent Number: 5,270,545
[45] Date of Patent: Dec. 14, 1993

[54] EXTERNAL COMPASS MODULE FOR NIGHT VISION DEVICES

[75] Inventors: Earle N. Phillips; Robert A. Gallagher, both of Roanoke, Va.

[73] Assignee: ITT Corporation, New York, N.Y.

[21] Appl. No.: 982,881

[22] Filed: Nov. 30, 1992

[51] Int. Cl.⁵ .................... G05D 25/00; F41G 1/32
[52] U.S. Cl. ...................................... 250/330; 362/29
[58] Field of Search .............. 250/330, 342, 214 VT, 250/214 LA; 362/29, 23; 33/334, 348; 353/11, 122

[56] References Cited

U.S. PATENT DOCUMENTS

| | | | |
|---|---|---|---|
| 4,402,140 | 9/1983 | Nagae | 33/334 X |
| 3,781,560 | 12/1973 | DeBurgh et al. | 250/333 |
| 4,266,129 | 5/1981 | Versteeg et al. | 250/330 |
| 4,463,252 | 7/1984 | Brennan et al. | 250/214 VT |
| 5,023,511 | 6/1991 | Phillips | 313/524 |
| 5,029,963 | 7/1991 | Naselli et al. | 385/33 |
| 5,077,611 | 12/1991 | Phillips et al. | 358/211 |
| 5,084,780 | 1/1992 | Phillips | 359/350 |

FOREIGN PATENT DOCUMENTS 2156541 10/1985 European Pat. Off. .............. 362/23

OTHER PUBLICATIONS

Instruction Manual for Tasco—Waterproof Binoculars, Model Nos. 322 BCW and 322 BW By Tasco Corporation, Pages 1-5.

*Primary Examiner*—Constantine Hannaher
*Assistant Examiner*—Edward J. Glick
*Attorney, Agent, or Firm*—Arthur L. Plevy; Patrick M. Hogan

[57] ABSTRACT

An external compass module for use with a night vision device. The module includes an annular ring which is adapted to fit a portion of the night vision device which contains the objective lens. The module further includes an enclosure having an internal chamber. A compass sensor having an angular scale for indicating direction is positioned within the chamber. Optical elements are positioned adjacent to the scale which relay and collimate an image of the scale to a reflecting lens element. The reflecting lens element then reflects the scale image toward the objective lens which results in the superimposition of the scale image on a scene being viewed by the user.

21 Claims, 3 Drawing Sheets

EXTERNAL COMPASS MODULE FOR NIGHT VISION DEVICES

FIELD OF THE INVENTION

This invention relates to night vision devices and more particularly, to an external compass module which includes an illuminated compass scale having an illumination level suitable for use with a night vision device.

BACKGROUND OF THE INVENTION

Night vision devices are well known in the art. Such devices are used by military and law enforcement personnel to enhance a user's ability to see during operations conducted in low light conditions. Generally, these devices operate in the 0.4 to 1.0 $\mu$m region of the electromagnetic spectrum and include an objective lens assembly, an ocular lens assembly and image intensifier tube. Image intensifier tubes multiply the amount of incident light received and thus provide an increase in light output which may then be supplied to a camera or directly to the eyes of a user. In regard to image intensifier tubes, reference is made to U.S. Pat. No. 5,023,511 entitled OPTICAL ELEMENT OUTPUT FOR AN IMAGE INTENSIFIER DEVICE which issued to Earle N. Phillips on Jun. 11, 1991 and U.S. Pat. No. 5,077,611 entitled UNIVERSAL IMAGE INTENSIFIER TUBE which issued to Phillips et al. on Dec. 31, 1991, both of which are assigned to ITT Corporation, the assignee herein.

There are various types of night vision devices. One type of night vision device is the night vision goggle system. This system is used at night by individuals to enhance their ability to perform tasks such as walking, driving, observation, map reading and others. In this regard, reference is made to U.S. Pat. No. 3,781,560 entitled NIGHT VIEWING SYSTEM FOR READING WITHOUT LIGHT which issued to Deburgh et al. on Dec. 25, 1973, U.S. Pat. No. 4,266,129 entitled DEVICE FOR VIEWING RESIDUAL LIGHT IN THE VISIBLE AND THE NEAR INFRARED SPECTRUM which issued to Versteeg et al. on May 5, 1981 and assigned to N. V. Optische Industrie "De Oude Delft", Delft, Netherlands and U.S. Pat. No. 4,463,252 entitled NIGHT VISION GOGGLE SYSTEM which issued to Brennan et al. on Jul. 31, 1984 and assigned to Baird Corporation.

Two types of night vision goggle systems are the AN/PVS-7A and AN/PVS-7B. In these systems, the ocular lens assembly further includes a collimator lens assembly and dual relay lens assembly. The collimator lens assembly is positioned to provide a collimated output image of the image intensifier output screen. The relay lens assembly then relays the collimated image from the collimator lens assembly to the user's eye for viewing. Commercial versions of these systems have been converted into night vision binoculars by the addition of longer focal length objective lenses to provide greater magnification. In addition, ITT Electro Optical Products Division of ITT Corporation in Roanoke, Va. has manufactured night vision binoculars for the U.S. military having 3X and 4.5X magnification. Many of these devices utilize GEN II or GEN III image intensifier tubes, which are well known in the industry.

In another type of night vision device, the ocular lens assembly is replaced by a relay lens so as to enable photographic recording of images. Alternately, the standard objective lens may be replaced with a larger objective lens to enable use of the device as a long range observation system or weaponsight. In regard to weaponsights, reference is made to copending U.S. patent application Ser. No. 07/647,544 entitled NIGHT SIGHT FOR MISSILE LAUNCHER by Phillips et al., filed on Jan. 29, 1991 and U.S. Pat. No. 5,084,780 entitled TELESCOPIC SIGHT FOR DAY/NIGHT VIEWING which issued to Earle N. Phillips on Jan. 28, 1992, both of which are assigned to ITT Corporation.

Moreover, a night vision device may be configured as a remote viewer by utilizing a camera or charge coupled device (CCD) type video device in place of the ocular lens assembly. This configuration provides image recording and remote viewing capabilities. In addition, night devices have been configured as gunner's and commander's sights for armored vehicles as well as driver's viewers. In this regard, reference is made to U.S. Pat. No. 5,029,963 entitled REPLACEMENT DEVICE FOR A DRIVER'S VIEWER which issued to Naselli et al. on Jul. 9, 1991 and is also assigned to ITT Corporation.

As can be ascertained, it is desirable to utilize a navigation aid for many military and law enforcement operations. One such navigation aid is the standard lensatic compass. A standard compass includes an angular scale that is used to align the compass with a distant object in order to obtain a "bearing". A disadvantage with utilizing such a compass at night in conjunction with a night vision device is that the scale may be very difficult to read due to lack of illumination. In addition, the scale may be difficult to read because of insufficient contrast between the scale and the background to which it is affixed.

Compass scales which are illuminated in order to aid reading of the scale at night are well known in the art. By way of example, Tasco Corporation manufactures binoculars designated as models 322 BCW and 322 BW each of which utilize an illuminated compass scale that is unistructural with the binocular. The illumination of the scale in each binocular is controlled by a switch which enables a user to turn the illumination on or off as desired. During nighttime operations, the user locates and focuses on a desired object in the normal manner with the illumination off. The user then illuminates the scale by manipulating the switch which enables the user to read the scale and determine direction.

However, such binoculars are designed for use with the unaided eye and without a night vision device. Therefore, a relatively high level of light is used to illuminate the scale in such binoculars which is sufficient to enable the unaided eye to read the scale. It is well known that such a level of light causes a degradation of the resolution of the image intensifier tube in a night vision device. Consequently, the use of such prior art illuminated scales in a night vision device would result in a degradation of resolution and a washed out effect of the viewed scene. As such, the ability of a user to read the compass scale after aligning the compass with a distant object would be severely restricted due to the washed out effect caused by prior art illuminated compass scales.

Therefore, there is a need in the art for a compass module having an illuminated compass scale with a sufficient illumination level to enable an operator to read the scale without degrading the resolution of the device. In addition, there is a need in the art for a compass scale having sufficient contrast with the background on which it is affixed in order to enhance viewing of the scale.

SUMMARY OF THE INVENTION

A compass module for use with a night vision device for enabling a user to view a scene at night, said night vision device including a lens assembly for directing incoming light from said scene along an optical path wherein the resolution of said night vision device undesirably degrades when said night vision device is subjected to a high level of light, comprising a compass having a scale for indicating direction, means for illuminating said scale with a level of light sufficient to enable said user to read said scale when utilizing said night vision device without substantially degrading said resolution of said night vison device, and projecting means for projecting an image of said scale along said optical path toward said lens assembly to enable said user to read said scale and view said scene simultaneously at night.

DETAILED DESCRIPTION OF THE FIGURES

Figure 1:
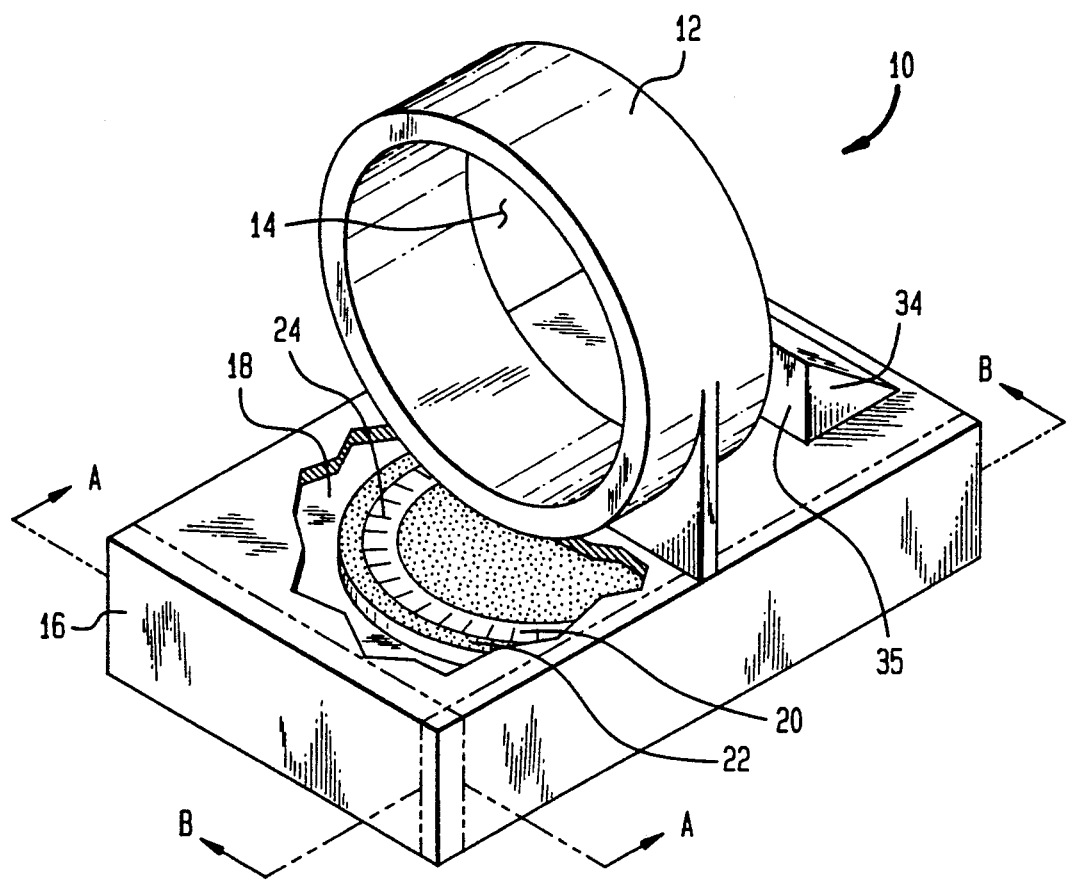
FIG. 1 is a view of an external compass module in accordance with the present invention.

Referring to FIG. 1, an external compass module 10 in accordance with the present invention is shown. The module 10 includes an annular ring 12 having an aperture 14. The ring 12 is adapted to fit a tubular member which includes a lens assembly as employed in a night vision device. The ring 12 may be fabricated from an elastomeric material to allow the ring 12 to be positioned over the tubular member of the night vision device. Alternately, the ring 12 may be formed from Velcro or a flexible material to form a strap and may include an adjustment means to place the ring about the tubular member or other type of lensholding assembly of a night vision device. The ring 12 may be unistructurally or separately formed in cooperation with a housing 16 having an internal chamber 18 (shown in a cutaway view).

A compass disc 20 is suspended within the chamber 18 and is rotatably affixed to the housing 16. A top surface 22 of the disc 20 includes an angular scale 24 having markings from 0° to 360°. In a first embodiment, the scale 24 may be a white opaque color or transparent and may be affixed on a disc fabricated from a dark opaque color material in order to provide high contrast and enhance visibility. Alternately, the scale 24 may have a dark opaque color and may be affixed on a disc fabricated from a substantially transparent or white opaque color material. In night vision devices, excess illumination may produce undesirable stray light which may cause a washing out effect of a night scene being viewed through the device. Therefore, it is desirable to reduce the amount of illumination to which these devices are subjected. Consequently, the first embodiment of the scale as shown in FIG. 1 is preferable since it provides a dark background which aids in reducing the amount of illumination and thus washing out effects.

A bar magnet (not shown) is attached to the disc. As is widely known in the art, the disc 20 and magnet configuration form a compass sensor for providing direction finding capability useful for navigation. Alternately, electronic sensors may be utilized to form a compass sensor. Such electronic sensors include a fluxgate compass or the sensor formed by positioning a pair of Hall effect transistors at a 90° angle. If an electronic sensor is utilized, the compass disc is replaced by a digital display (not shown) having markings from 0° to 360°. The digital display may be a liquid crystal display (LCD) or a light emitting diode (LED) type display, both of which are well known in the art.

Positioned behind the ring 12 and affixed to a top surface of the housing 16 is a reflecting lens element 34. The reflecting lens element 34 includes a front surface 35 which is adjacent to the ring 12. The reflecting lens element 34 may be any suitable mirror or prism. As will be described, the reflecting lens element 34 serves to reflect an image of a section of the scale 24 which is then transmitted through front surface 35 for projection into the lens assembly of a night vision device.

Figure 2:
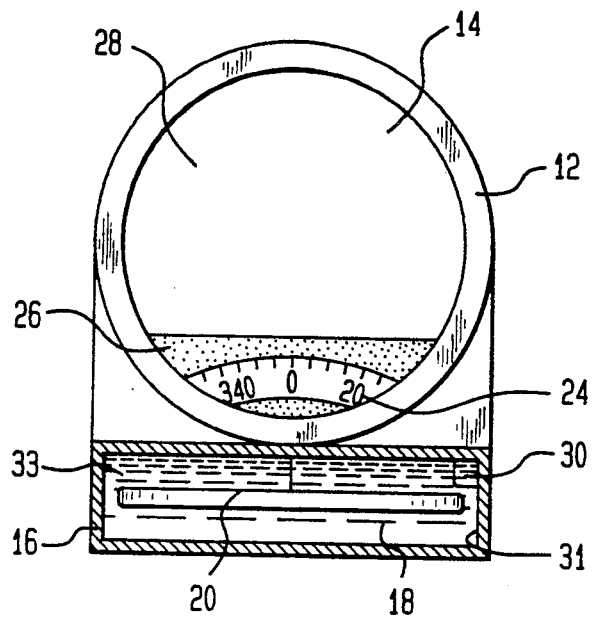
FIG. 2 is a cross sectional view of the external compass module along section line A—A of FIG. 1.

Referring to FIG. 2 in conjunction with FIG. 1, a cross sectional view of the module 10 along section line A—A is shown. Like reference numbers indicate like elements. An image of a section of the scale 24 is shown positioned in a lower portion 26 of the aperture 14 of the ring 12. The image is provided by the front surface 35 (FIG. 1) of the reflecting lens element 34 which is positioned behind the ring 12 in FIG. 2. An upper portion 28 of the aperture 14 is unobstructed and is utilized for viewing a scene.

An illuminating means 30 for illumination of the scale 24 is affixed to an internal wall 31 of the chamber 18. The illuminating means 30 provides a low level of light sufficient to enable a user to read the scale 24 at night while utilizing a night vision device. Prior art illuminated compass scales are designed for use with the unaided eye and thus provide a relatively high level of light. As is widely known, such a relatively high level of light causes a degradation in the resolution of an image intensifier tube of a night vision device. In accordance with the present invention, the illuminating means 30 may be a clear glass vial filled with a radioactive gas such as tritium. Alternately, the illuminating means 30 may be light emitting diode (LED) which is energized by a power source such as a battery pack (not shown) integral with or external to the module 10. It is known that either configuration provides a relatively low level of light which does not substantially degrade the resolution of the night vision device.

The internal chamber 18 may be filled with a damping fluid 33 for reducing mechanical vibrations of the disc 20. The damping fluid 33 is substantially clear to enable the transmission of a substantial amount of light from the illuminating means to the disc 20. Moreover, if an LCD is utilized to display the angular markings as previously described, the LCD may be illuminated by the illuminating means. However, if an LED type display is utilized, the LED's in the display generally provide sufficient illumination of the display to enable viewing under low light conditions.

Figure 3:
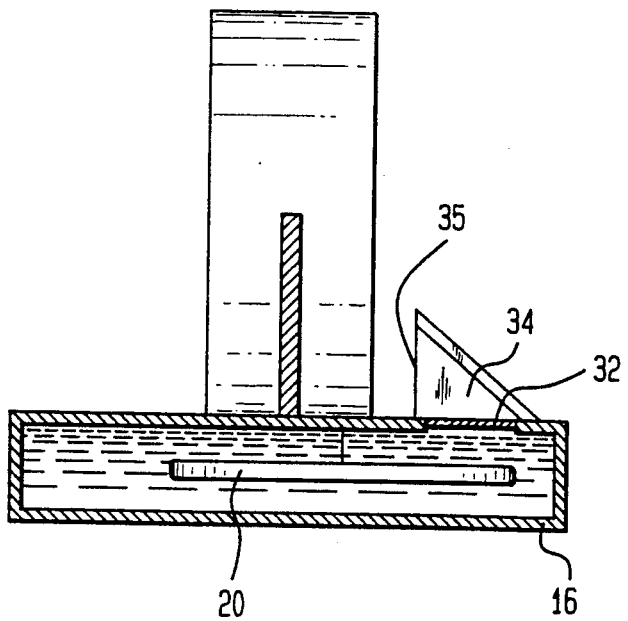
FIG. 3 is a cross sectional view of the external compass module along section line B—B of FIG. 1.

Referring to FIG. 3 in conjunction with FIG. 1, a cross sectional side view of the present invention along section line B—B is shown. Like reference numbers indicate like elements. An optical assembly 32 is positioned adjacent to the disc 20 and affixed within a bore of the housing 16. The optical assembly 32 serves to relay and collimate light from the scale 24. The reflecting lens element 34 is affixed to a top surface of the housing 16 with the front surface 35 positioned adjacent to the ring 12. In addition, the reflecting lens element 34 is positioned over the bore and adjacent to the optical assembly 32. The reflecting lens element 34 receives light from the optical assembly 32 and reflects the light for projection into a lens assembly of a night vision device. Consequently, an image of a section of the scale 24 (FIG. 2) appears in the lower portion 26 of the aperture 14 and the viewed scene appears in the upper portion 28. Alternately, a beamsplitter (not shown) covering the entire aperture 14 may be used in place of the reflecting lens element 34. Furthermore, it is understood that a curved reflector may be used to collimate the image for projection into the lens assembly of the night vision device.

Figure 4:
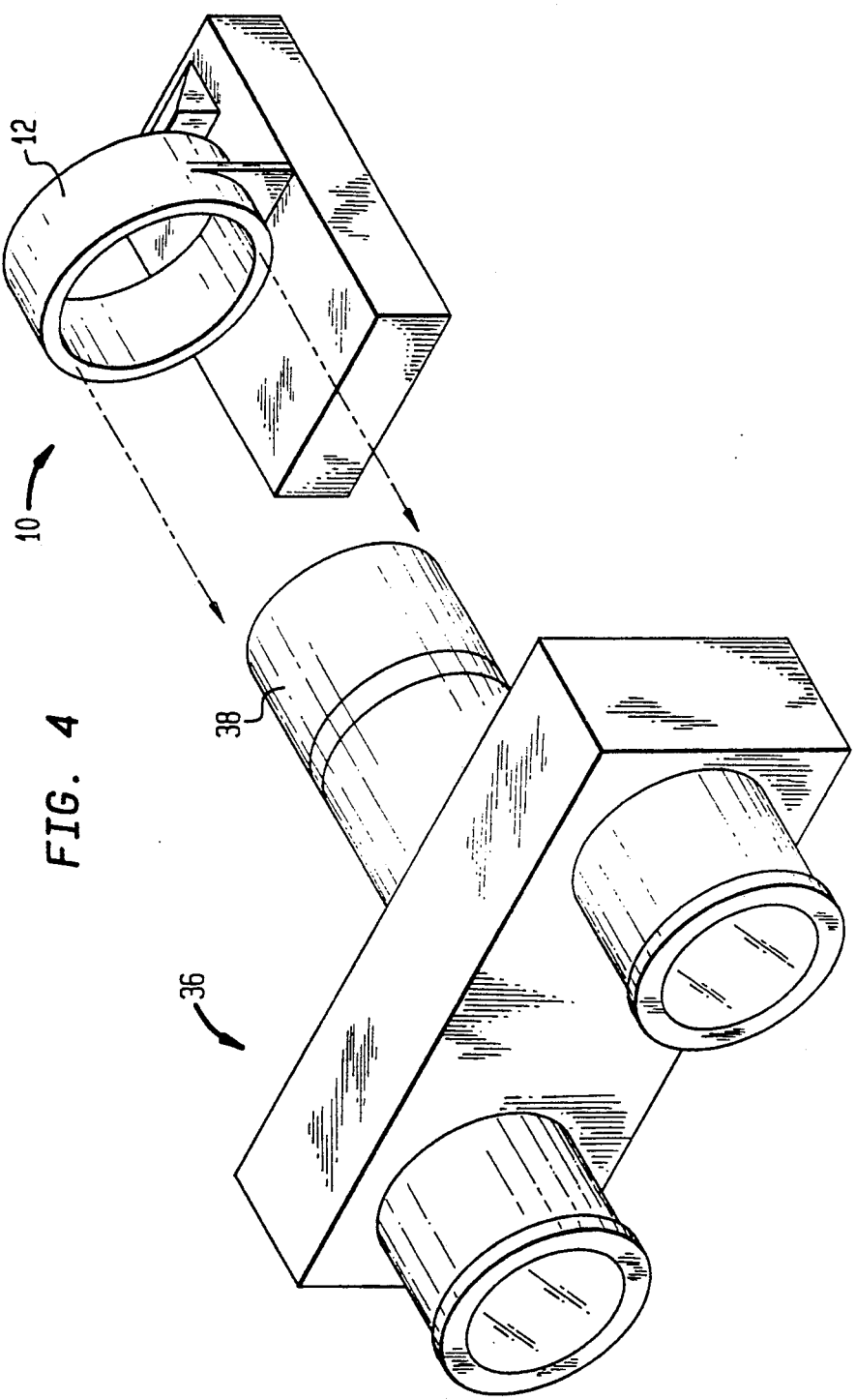
FIG. 4 shows the external compass module and a night vision goggle system.

Referring to FIG. 4, the module 10 and a night vision goggle system 36 are shown. Night vision goggle systems are well known and it is understood that the present invention may be used in combination with other night vision devices such as intensified camera systems, night observation devices and night vision weaponsights. In regard to weaponsights, reference is made to copending U.S. patent application Ser. No. 07/647,544 entitled NIGHT SIGHT FOR MISSILE LAUNCHER by Phillips et al. filed on Jan. 29, 1991 and which is assigned to ITT Corporation. The night vision goggle system 36 includes a substantially tubular shaped front housing 38. An objective lens assembly (not shown) is located within the front housing 38. The objective lens assembly serves to collect and focus available light from a viewed scene. The ring 12 is adapted to encircle the front housing 38. Moreover, the outer diameter of the front housing 38 and the inner diameter of the ring 12 are such that a friction fit exists when the ring 12 is positioned on the housing 16. This enables the ring 12 to be removeably secured to the front housing 38. Consequently, the module 10 may be installed on or removed from a night vision device as desired. This provides for easy storage and shipment of the module 10 and further enables the use of the module 10 with other night vision devices.

In operation, the user views through the upper portion 28 (FIG. 2) and aligns the system with a desired object to obtain a bearing. The disc 20 (FIG. 1) then rotates to an angle indicative of the position of the desired object. Light from the scale 24 is then relayed and collimated by the optical assembly 32 (FIG. 2) and received by the reflecting lens element 34. The light is then reflected and projected into the objective lens assembly of the night vision goggle system 36 and appears superimposed on the viewed scene.

It is understood that other configurations may be utilized to provide an external compass module for an existing night vision device. In one configuration, a lens cap including the compass module may be provided. In addition, the lens cap may be pivotally attached to the night vision device to enable positioning of the compass module in front of the lens of the night vision device as desired.

What is claimed is:

1. A compass module for use with a night vision device for enabling a user to view a scene at night, said night vision device including a lens assembly for directing incoming light from said scene along an optical path wherein the resolution of said night vision device undesirably degrades when said night vision device is subjected to a high level of light, comprising:
   a compass having a scale for indicating direction;
   illuminating means for illuminating said scale with a level of light sufficient to enable said user to read said scale when utilizing said night vision device without substantially degrading said resolution of said night vision device; and
   projecting means for projecting an image of said scale along said optical path toward said lens assembly to enable said user to read said scale and view said scene simultaneously at night.

2. The module according to claim 1, wherein said illuminating means is an LED or a substantially clear vial filled with tritium gas.

3. The module according to claim 1, wherein said projection means includes a mirror.

4. The module according to claim 1, wherein said projection means includes a prism.

5. The module according to claim 1, wherein said projection means includes an optical assembly for relaying and collimating said image.

6. The module according to claim 1, further including securing means for securing said module to said night vision device.

7. The module according to claim 6, wherein said securing means is an upstanding annular ring secured to said lens assembly.

8. In a night vision device for enabling a user to view a scene at night, said night vision device including a tubular housing having a lens assembly for directing incoming light from said scene along an optical path wherein the resolution of said night vision device undesirably degrades when said night vision device is subjected to a high level of light, in combination therewith a compass module, comprising:
   a compass having a scale for indicating direction;
   means for illuminating said scale with a level of light sufficient to enable said user to read said scale when utilizing said night vision device without substantially degrading said resolution of said night vision device; and
   projection means for projecting an image of said scale along said optical path toward said lens assembly to enable said user to read said scale and view said scene simultaneously at night.

9. The module according to claim 8, wherein said illuminating means is an LED or a substantially clear vial filled with tritium gas.

10. The module according to claim 8, wherein said projection means includes a mirror.

11. The module according to claim 8, wherein said projection means includes a prism.

12. The module according to claim 8, wherein said projection means includes an optical assembly for relaying and collimating said image.

13. The module according to claim 8, further including securing means for securing said module to said night vision device.

14. The module according to claim 13, wherein said securing means is an upstanding annular ring secured to said tubular housing.

15. An external compass module for use with a night vision device for enabling a user to view a scene at night, said night vision device including a lens assembly for directing incoming light from said scene along an optical path wherein the resolution of said night vision device undesirably degrades when said night vision device is subjected to a high level of light, comprising:
- an enclosure having an internal chamber, said enclosure including securing means for securing said compass module to said lens assembly;
- a compass affixed within said chamber, said compass including a scale for indicating direction;
- illuminating means for illuminating said scale with a level of light sufficient to enable said user to read said scale when utilizing said night vision device without substantially degrading said resolution of said night vision device;
- projection means for projecting an image of said scale along said optical path toward said lens assembly to enable said user to read said scale and view said scene simultaneously at night.

16. The module according to claim 15, wherein said illuminating means is an LED or a substantially clear vial filled with tritium gas.

17. The module according to claim 15, wherein said projection means includes a mirror.

18. The module according to claim 15, wherein said projection means includes a prism.

19. The module according to claim 15, wherein said projection means includes an optical assembly for relaying and collimating said image.

20. The module according to claim 15, wherein said securing means is an upstanding annular ring secured to said lens assembly.

21. A method of indicating direction for use with a night vision device for enabling a user to view a scene at night, said night vision device including a compass having a scale for indicating said direction and a lens assembly for directing incoming light from said scene along an optical path wherein the resolution of said night vision device undesirably degrades when said night vision device is subjected to a high level of light, comprising the steps of:
- illuminating said scale with a level of light sufficient to enable said user to read said scale when utilizing said night vision device without substantially degrading said resolution of said night vision device; and
- projecting an image of said scale along said optical path toward said lens assembly to enable said user to read said scale and view said scene simultaneously at night.

* * * * *